US012448838B2

(12) United States Patent
Huang

(10) Patent No.: US 12,448,838 B2
(45) Date of Patent: Oct. 21, 2025

(54) ADJUSTABLE RESISTANCE TAIL PLUG

(71) Applicants: Beautiful Window Fashions Co., Ltd., Fuxing Township, Changhua County (TW); TAICANG KINGFU PLASTIC MANUFACTURE CO., LTD., Taicang (CN)

(72) Inventor: Szu-Chang Huang, Fusing Township, Changhua County (TW)

(73) Assignees: BEAUTIFUL WINDOW FASHIONS CO., LTD., Fuxing Township (TW); TAICANG KINGFU PLASTIC MANUFACTURE CO., LTD., Taicang (CN)

( * ) Notice: Subject to any disclaimer, the term of this patent is extended or adjusted under 35 U.S.C. 154(b) by 407 days.

(21) Appl. No.: 18/156,294

(22) Filed: Jan. 18, 2023

(65) Prior Publication Data

US 2024/0151103 A1 May 9, 2024

(30) Foreign Application Priority Data

Nov. 3, 2022 (CN) ......................... 202222962082.0

(51) Int. Cl.
*E06B 9/44* (2006.01)

(52) U.S. Cl.
CPC ...................................... *E06B 9/44* (2013.01)

(58) Field of Classification Search
CPC ..... E06B 9/42; E06B 9/44; E06B 9/50; E06B 9/60; E06B 9/80; E06B 9/90; E06B 2009/807
See application file for complete search history.

(56) References Cited

U.S. PATENT DOCUMENTS

| | | | | |
|---|---|---|---|---|
| 4,188,992 | A * | 2/1980 | Segerljung | E06B 9/82 160/299 |
| 4,523,620 | A * | 6/1985 | Mortellite | E06B 9/60 160/315 |
| 7,147,030 | B2 * | 12/2006 | Dalle Nogare | E06B 9/56 160/315 |
| 10,995,545 | B2 * | 5/2021 | Chen | E06B 9/364 |
| 12,110,741 | B2 * | 10/2024 | Lee | E06B 9/42 |
| 2005/0205224 | A1 * | 9/2005 | Dalle Nogare | E06B 9/60 160/321 |
| 2017/0159359 | A1 * | 6/2017 | Vries | E06B 9/42 |

* cited by examiner

*Primary Examiner* — Abe Massad
(74) *Attorney, Agent, or Firm* — HSML P.C.

(57) ABSTRACT

An adjustable resistance tail plug includes a fixed seat, an adjusting wheel, a sleeve, a screw rod unit, an outer casing, a friction wheel and a clutch spring. The friction wheel engages threadably the screw rod unit, and is driven by the sleeve to move relative to the outer casing, so as to adjust a friction force between the outer casing and the friction wheel. The clutch spring is switchable between a contracted state and an expanded state. When in the contracted state, the clutch spring is tightened to abut against the second circumferential surface so that the sleeve is prevented from rotating relative to the fixed seat by the clutch spring. When in the expanded state, the clutch spring releases the second circumferential surface, and the adjusting wheel is rotatable with the sleeve through the clutch spring.

11 Claims, 11 Drawing Sheets

ADJUSTABLE RESISTANCE TAIL PLUG

CROSS-REFERENCE TO RELATED APPLICATION

This application claims priority to Chinese Utility Model Patent Application No. 202222962082.0, filed on Nov. 3, 2022.

FIELD

The disclosure relates to a window blind, and more particularly to an adjustable resistance tail plug.

BACKGROUND

A conventional window blind includes a rotary shaft, a blind body rollable by the rotary shaft, a pull cord for driving rotation of the rotary shaft, and a resistance member for extension of the pull cord therethrough. When the pull cord is pulled, the rotary shaft is rotated to scroll the blind body and the pull cord is resisted through the resisting member, and when the pull cord is no longer pulled, the resisting member can restrict further movement of the pull cord caused by the gravity of the blind body and maintain the position of the blind body.

However, when the resistance member deteriorates due to long-term use, the resistance member must be replaced, which increases maintenance costs.

SUMMARY

Therefore, an object of the disclosure is to provide an adjustable resistance tail plug that can alleviate the drawback of the prior art.

An adjustable resistance tail plug for a roller blind device. The roller blind device includes an aluminum tube, a blind body that is scrolled by the aluminum tube, and a mounting bracket that is disposed at one side of the aluminum tube. The adjustable resistance tail plug includes a fixed seat, an adjusting wheel, a sleeve, a screw rod unit, an outer casing, a friction wheel and a clutch spring. The fixed seat is adapted to be disposed on the mounting bracket, and has a first circumferential surface that surrounds an axis, and a second circumferential surface that surrounds the axis. The second circumferential surface is located at one side of the first circumferential surface opposite to the mounting bracket. A section of the fixed seat that has the second circumferential surface has an outer diameter smaller than another section of the fixed seat that has the first circumferential surface. The adjusting wheel is rotatably sleeved on the first circumferential surface. The sleeve is rotatably sleeved on the adjusting wheel. The screw rod unit is connected to the fixed seat and extends along the axis. The outer casing includes a casing body that is adapted to be disposed on the aluminum tube and that is connected to the screw rod unit, and an inner cavity that formed in the casing body. The inner cavity is for receiving the sleeve, a portion of the adjusting wheel and a portion of the fixed seat. The friction wheel is located within the inner cavity, engages threadably the screw rod unit, and is driven by the sleeve to move relative to the casing body along the axis, so as to adjust a friction force between the casing body and the friction wheel. The clutch spring is sleeved on the second circumferential surface, and is partially located between the sleeve and the adjusting wheel. The clutch spring is switchable between a contracted state and an expanded state. In the contracted state, the clutch spring is tightened to abut against the second circumferential surface so that the sleeve is prevented from rotating relative to the fixed seat by the clutch spring. In the expanded state, the clutch spring releases the second circumferential surface, and the adjusting wheel is rotatable with the sleeve through the clutch spring about the axis.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
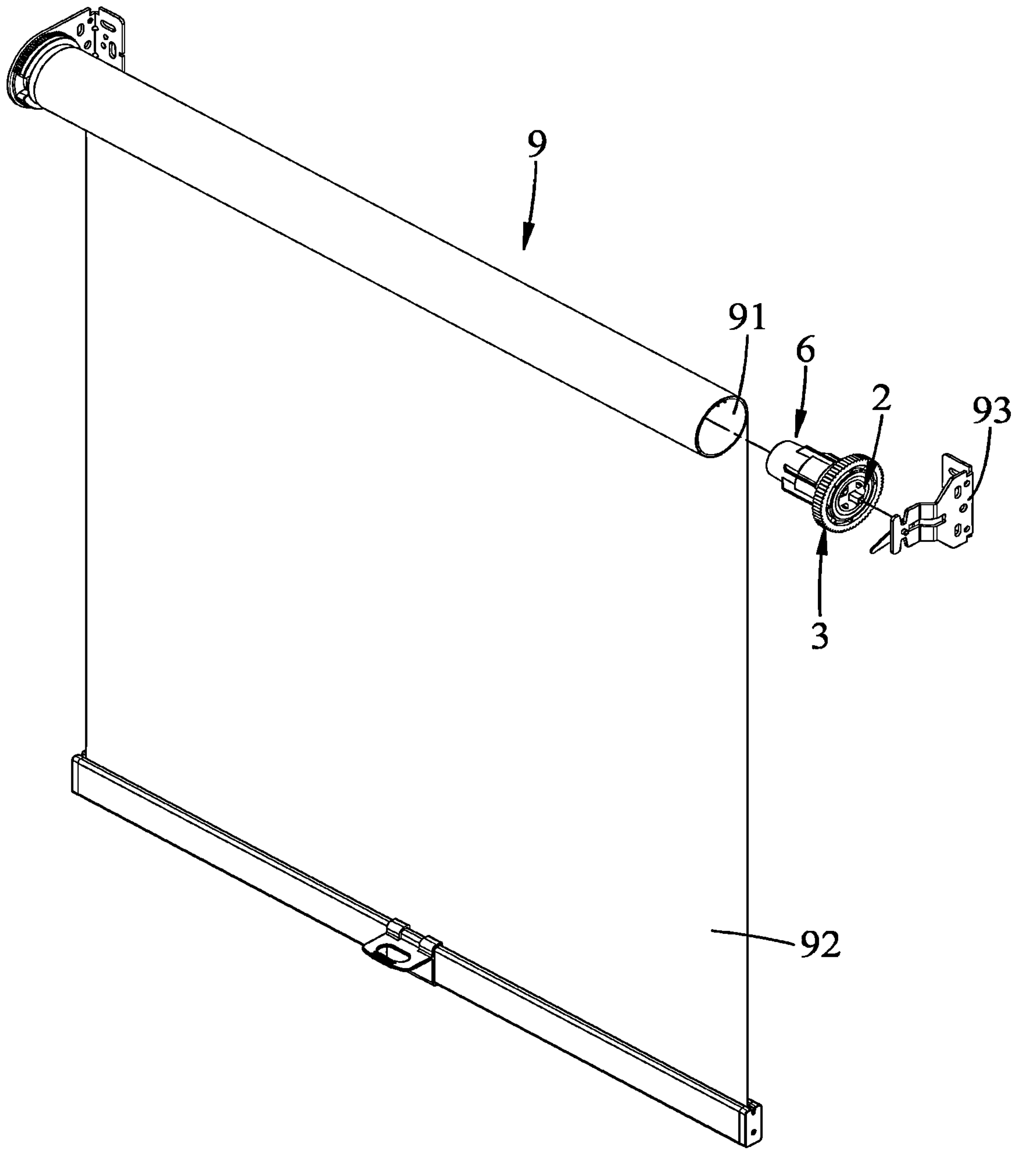
FIG. 1 is an exploded perspective view illustrating a first embodiment of an adjustable resistance tail plug according to the present disclosure used in a roller blind device.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
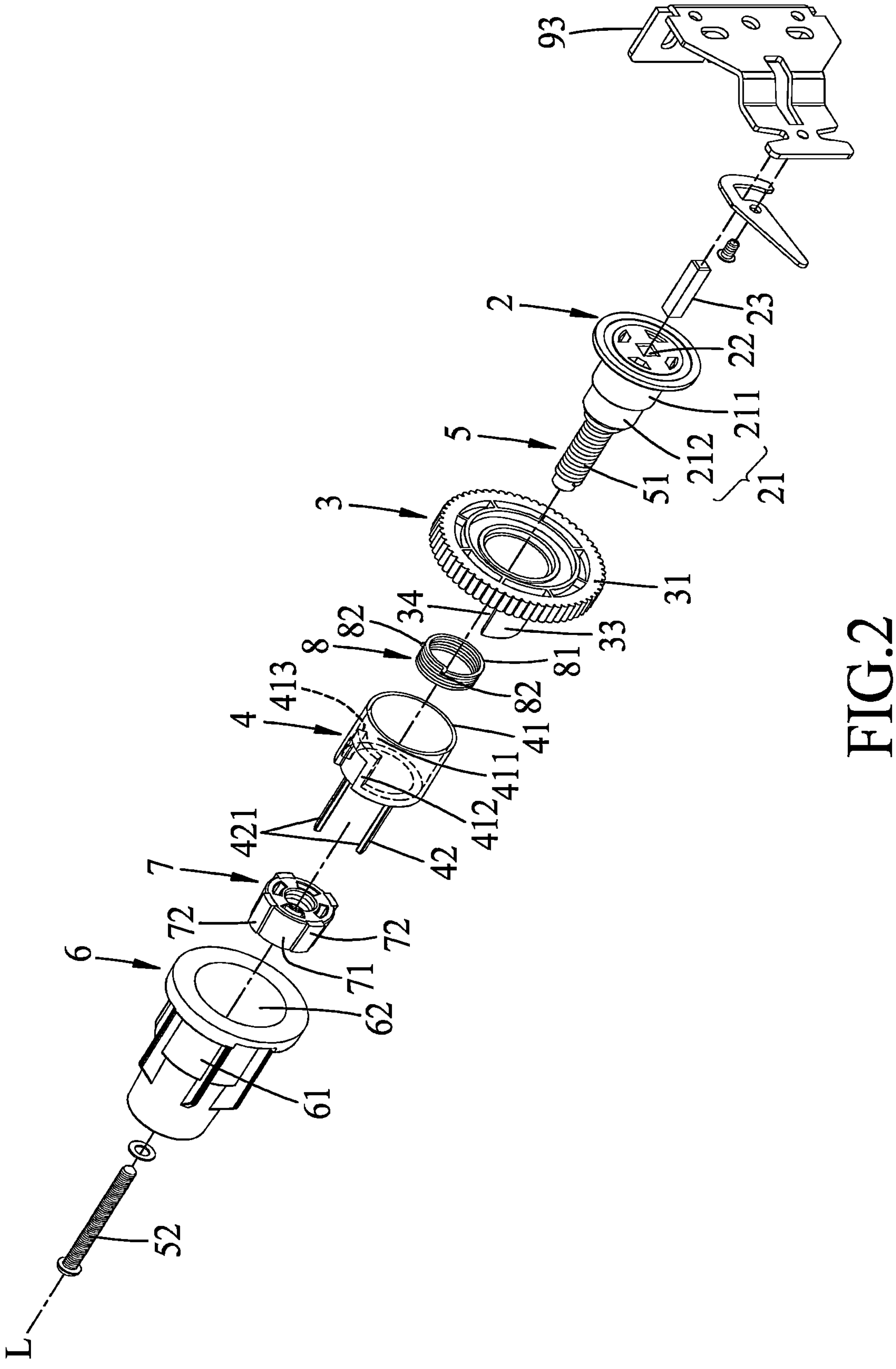
FIG. 2 is an exploded perspective view illustrating the first embodiment.
Figure 3:
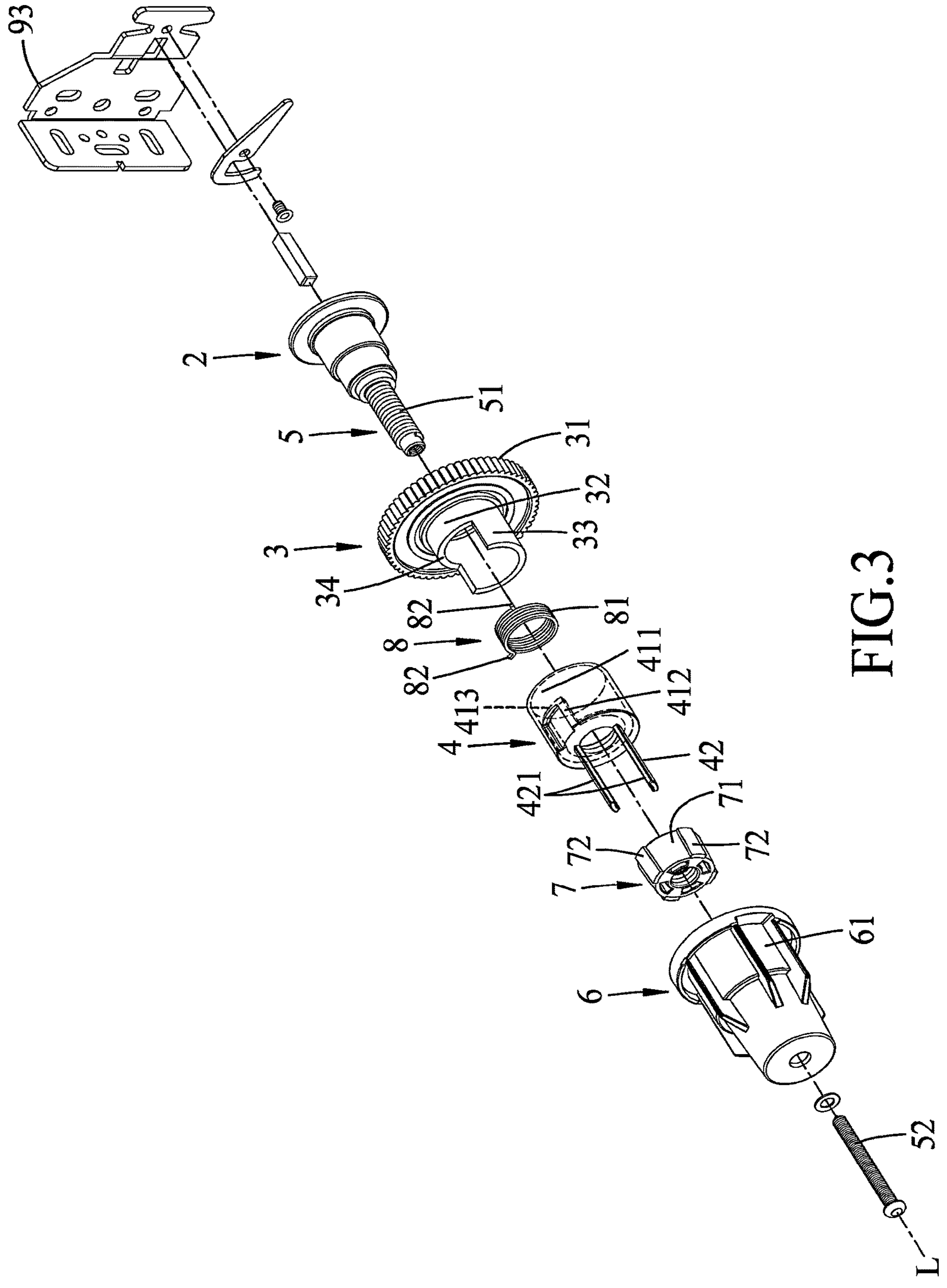
FIG. 3 is another exploded perspective view illustrating the first embodiment.

Referring to FIGS. 1, 2 and 3, a first embodiment of the adjustable resistance tail plug according to the present disclosure is used in a roller blind device 9. The roller blind device 9 includes an aluminum tube 91, a blind body 92 scrolled by the aluminum tube 91, and a mounting bracket 93 disposed at one side of the aluminum tube 91. The adjustable resistance tail plug includes a fixed seat 2, an adjusting wheel 3, a sleeve 4, a screw rod unit 5, an outer casing 6, a friction wheel 7, and a clutch spring 8.

The fixed seat 2 is mounted to the mounting bracket 93, and includes a fixed seat body 21 extending along an axis (L), a fixed hole 22 formed in the fixed seat body 21, and a fixed member 23 extending into the fixed hole 22 and adapted to be mounted to the mounting bracket 93.

The fixed seat body 21 has a first circumferential surface 211 and a second circumferential surface 212. The first circumferential surface 211 surrounds the axis (L). The second circumferential surface 212 surrounds the axis (L), and is disposed at one side of the first circumferential surface 211 opposite the mounting bracket 93. A section of the fixed seat body 21 having the second circumferential surface 212 has an outer diameter smaller than another section of the fixed seat body 21 having the first circumferential surface 211. The fixed hole 22 is a non-circular hole, and extends along the axis (L). A cross-sectional shape of the fixed member 23 which extends into the fixed hole 22 corresponds to the fixed hole 22.

The adjusting wheel 3 is rotatably sleeved on the first circumferential surface 211. The adjusting wheel 3 includes a rotary section 31 surrounding the first circumferential surface 211, a sleeve connecting section 32 connected to the rotary section 31 along the axis (L), and a toggling section 33 extending from the sleeve connecting section 32 away from the rotary section 31 along the axis (L). The sleeve connecting section 32 surrounds the first circumferential surface 211. The toggling section 33 extends about the axis (L), and defines a notch 34 corresponding in position to the second circumferential surface 212.

The sleeve 4 is rotatably sleeved on the adjusting wheel 3. The sleeve 4 includes a sleeve section 41 sleeved on the sleeve connecting section 32, and an engaging section 42 connected to one side of the sleeve section 41 opposite to the rotary section 31. The sleeve section 41 has a first annular wall 411 corresponding in position to the sleeve connecting section 32, a second annular wall 412 corresponding in position to the toggling section 33, and a boss 413 extending radially from the second annular wall 412 toward the notch 34. The engaging section 42 has two engaging rods 421.

The screw rod unit 5 is connected to the fixed seat 2, extends along the axis (L), and includes a threaded member 51 connected to the fixed seat 2, and a fastener 52 screwed to the threaded member 51.

The outer casing 6 includes a casing body 61 disposed inside the aluminum tube 91 and connected to the screw rod unit 5, and an inner cavity 62 formed in the casing body 61. The fastener 52 is inserted into and positioned in the casing body 61. The inner cavity 62 is configured to receive the sleeve 4, a portion of the adjusting wheel 3, and a portion of the fixed seat 2. In this embodiment, the outer casing 6 is co-rotatably connected to the aluminum tube 91.

Figure 4:
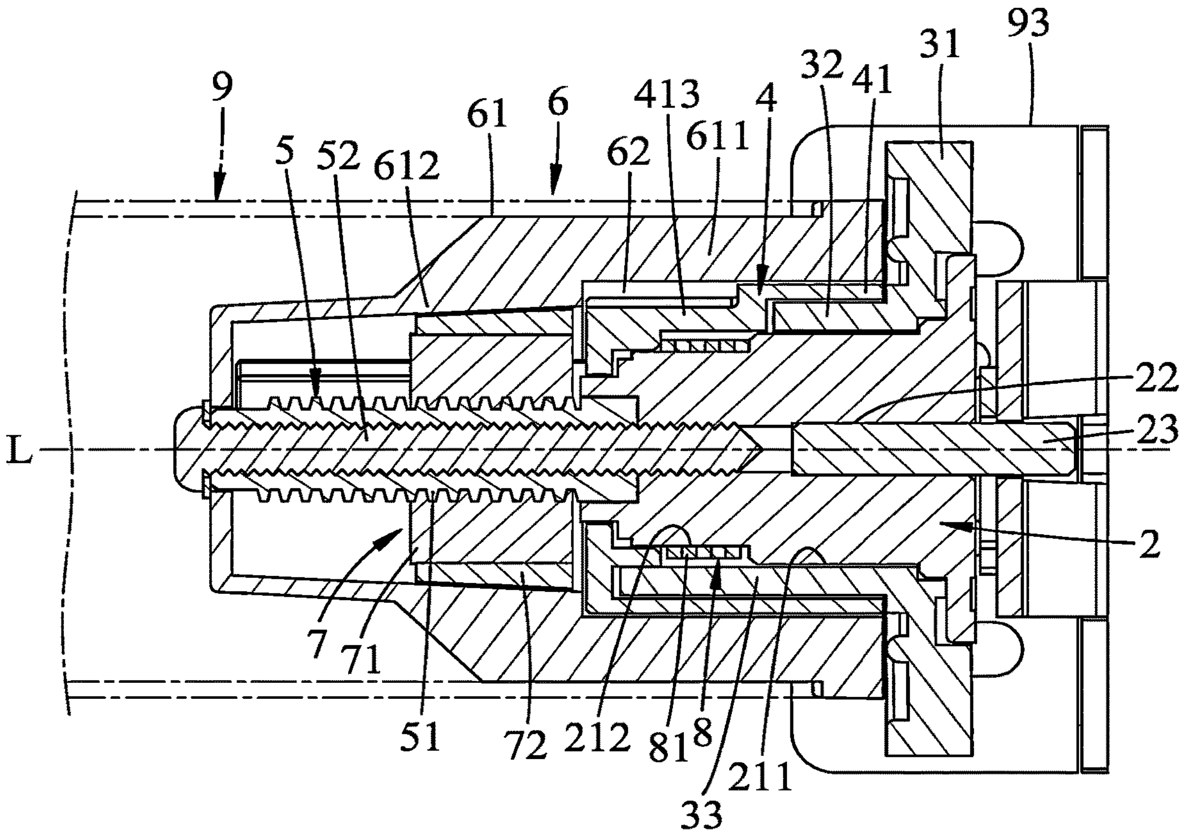
FIG. 4 is an assembled sectional view of the first embodiment and a mounting bracket.

Referring to FIGS. 2, 3, and 4, the casing body 61 has a large diameter portion 611 adjacent to the rotary section 31 and having an inner diameter larger than the outer diameter of the friction wheel 7, and a taper portion 612 disposed at one side of the large diameter portion 611 opposite to the rotary section 31 along the axis (L). The taper portion 612 has an inner diameter tapering from a side adjacent to the large diameter portion 611 toward another side distal from the large diameter portion 611. A portion of the inner cavity 62 defined in the taper portion 612 is a taper hole.

The friction wheel 7 is located in the inner cavity 62, engages threadably the screw rod unit 5, and is inserted by the engaging rods 421. The friction wheel 7 is able to be rotated by the sleeve 4, and is movable relative to the casing body 61 along the axis (L) so as to adjust the friction force relative to the casing body 61. The friction wheel 7 includes a wheel body 71 engaging threadably the threaded member 51 of the screw rod unit 5, and a plurality of friction members 72 disposed on an outer periphery of the wheel body 71. In this embodiment, a side of the taper portion 612 of the casing body 61 distal from the large diameter portion 611 has an inner diameter smaller than an outer diameter of the friction wheel 7. In this embodiment, the friction members 72, are spaced apart from each other, are disposed around the wheel body 71, and are made of a wear resistant felt, but are not limited thereto.

The clutch spring 8 is sleeved on the second circumferential surface 212, and is partially located between the sleeve 4 and the adjusting wheel 3. The clutch spring 8 includes a winding section 81 extending helically around the second circumferential surface 212, and two protrusions 82 respectively connected to two opposite sides of the winding section 81 and extending outwardly into the notch 34. In this embodiment, the boss 413 of the sleeve 4 extends inwardly into a space between the protrusions 82. That is to say, each of the protrusions 82 is located between a corresponding side of the boss 413 and a corresponding side of the toggling section 33.

The clutch spring 8 is switchable between a contracted state and an expanded state. In the contracted state, the protrusions 82 are relatively far away from each other in the notch 34, so that the winding section 81 of the clutch spring 8 is tightened to abut against the second circumferential surface 212, and the sleeve 4 is prevented from rotating relative to the fixed seat 2 by the clutch spring 8. In the expanded state, the clutch spring 8 releases the second circumferential surface 212, and the adjusting wheel 3 is rotatable with the sleeve 4 through the clutch spring 8 about the axis (L).

With reference to FIGS. 1, 3 and 4, during use, the friction wheel 7 is first adjusted to abut against the taper portion 612 of the outer casing 6. When the roller blind device 9 is subjected to an external force to rotate the aluminum tube 91 and scroll the blind body 92, the outer casing 6 driven by the aluminum tube 91 would frictionally drive the friction wheel 7 and the sleeve 4 to rotate together, and one side of the boss 413 of the sleeve 4 corresponding to the rotational direction would push one of the protrusions 82 of the clutch spring 8 to rotate, so that the winding section 81 wraps and is urged against the second circumferential surface 212, and that the clutch spring 8 is switched to the contracted state. At this time, the aluminum tube 91 and the outer casing 6 can rotate after overcoming the friction force between the outer casing 6 and the friction wheel 7.

When the external force acting on the roller blind device 9 is removed, the aluminum tube 91 is only affected by the gravity of the blind body 92. Since the rotational force generated by gravity causes the boss 413 to slightly push the clutch spring 8, the clutch spring 8 remains in the contracted state. At this time, the rotational force acting on the aluminum tube 91 is smaller than the frictional forces between the outer casing 6 and the friction wheel 7, so that the aluminum tube 91 stops rotating, and thus the blind body 92 remains stationary.

Furthermore, if the frictional force between the friction wheel 7 and the outer casing 6 is insufficient, even if the clutch spring 8 is still in the contracted state, the outer casing 6 will still rotate relative to the friction wheel 7 to generate a false operation (i.e., the aluminum tube 91 continues rotating after the external force is removed), so that the blind body 92 cannot immediately stop, thereby requiring adjustment of the frictional force.

To adjust the frictional force, the adjusting wheel 3 is operated to rotate relative to the fixed seat 2, so that one side of the toggling section 33 pushes one of the protrusions 82 of the clutch spring 8 to rotate, so that the winding section 81 releases the second circumferential surface 212, and the clutch spring 8 is switched to the expanded state. At this time, the toggling section 33 pushes one of the protrusions 82 to rotate together with the clutch spring 8, and the other one of the protrusions 82 pushes the boss 413, so that the sleeve 4 rotates relative to the threaded member 51. The sleeve 4 drives the friction wheel 7 to rotate and move along the threaded member 51 toward the taper portion 612 of the outer casing 6, thereby enhancing the friction force between the friction wheel 7 and the outer casing 6, so as to solve the problem of insufficient friction.

Therefore, through the design of the clutch spring 8 being switchable relative to the fixed seat 2 between the contracted state and the expanded state, the clutch spring 8 can be immovable relative to the fixed seat 2 (i.e, in the contracted state) to allow the friction wheel 7 to provide friction force, and can allow the adjusting wheel 3 to adjust the position of the friction wheel 7 to change the friction force.

Figure 5:
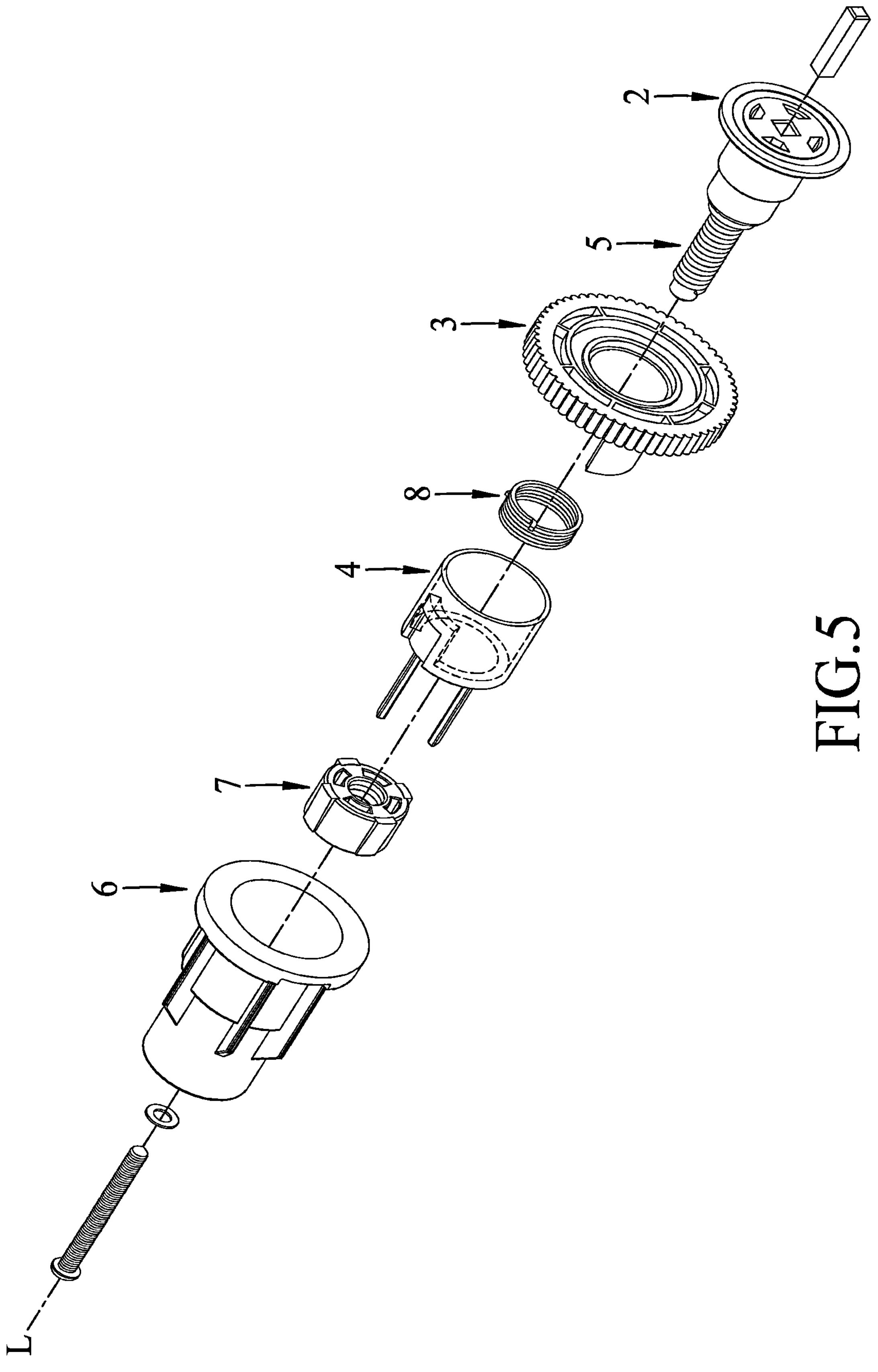
FIG. 5 is an exploded perspective view of a second embodiment of the adjustable resistance tail plug according to the present disclosure.
Figure 6:
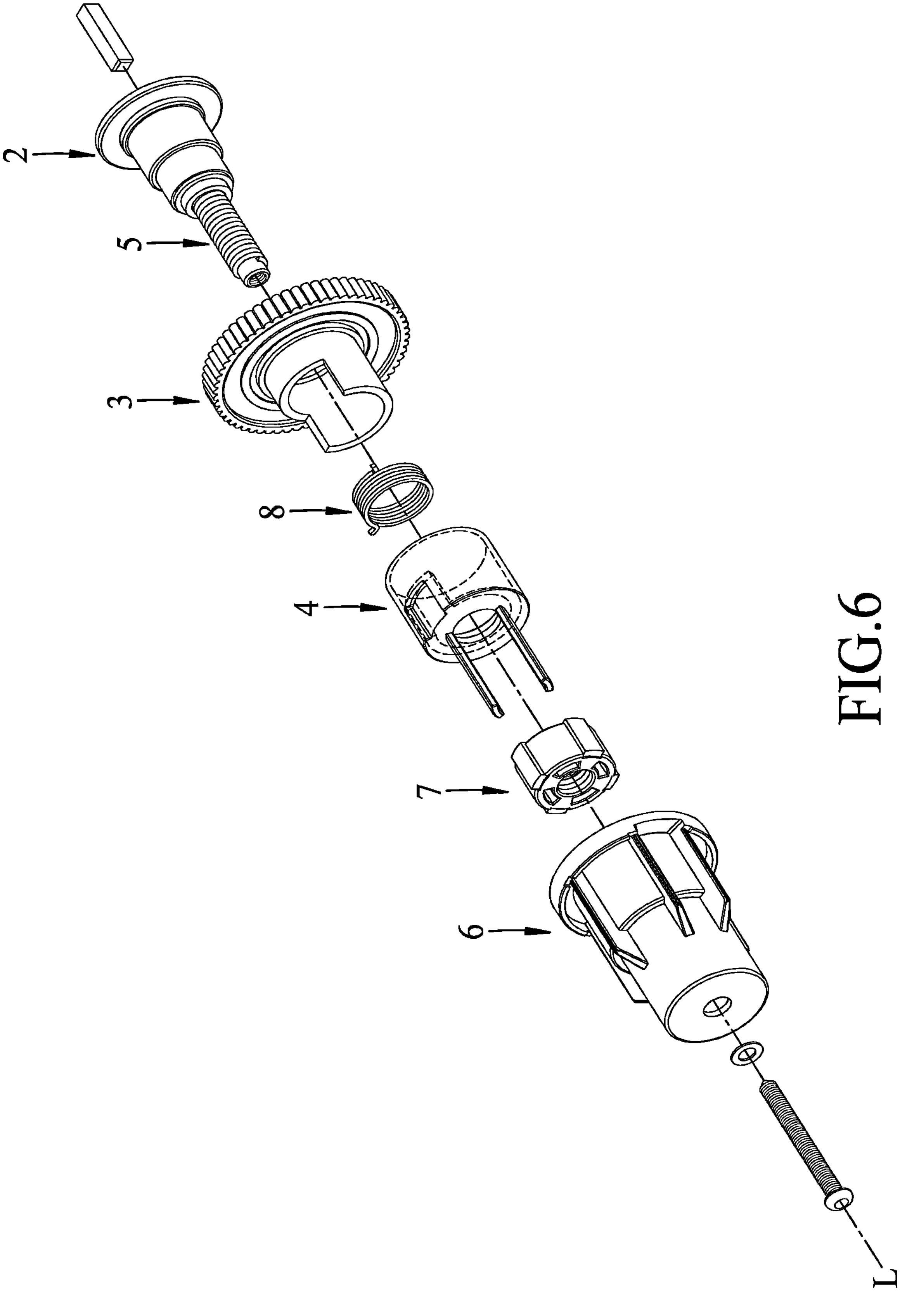
FIG. 6 is another exploded perspective view of the second embodiment.
Figure 7:
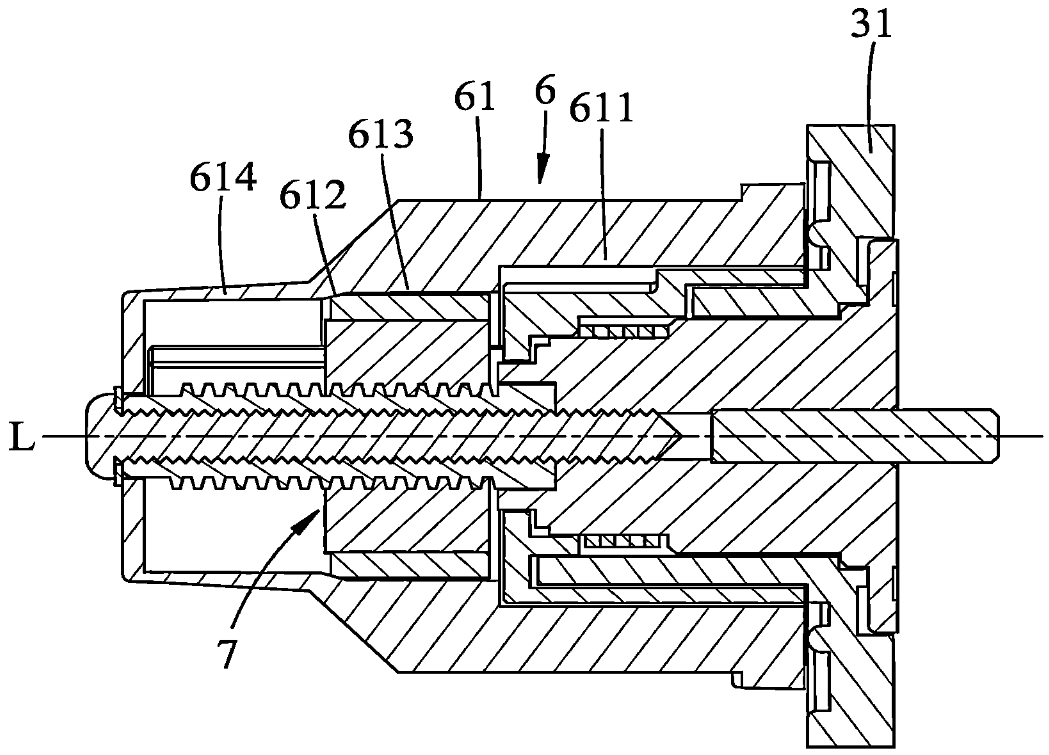
FIG. 7 is a sectional view of the second embodiment.

Referring to FIGS. 5, 6 and 7, a second embodiment of the adjustable resistance tail plug of this disclosure is similar to the first embodiment, but differs in that:

The casing body 61 has a large diameter portion 611 adjacent to the rotary section 31 and having an inner diameter larger than the outer diameter of the friction wheel 7, a taper portion 612 located on one side of the large diameter portion 611 opposite to the rotary section 31, a middle diameter portion 613 located between the large diameter portion 611 and the taper portion 612 and having an inner diameter smaller than the inner diameter of the large diameter portion 611, and a small diameter portion 614 located on one side of the taper portion 612 opposite the middle diameter portion 613 and having an inner diameter smaller than the inner diameter of the middle diameter portion 613 and the outer diameter of the friction wheel 7. The inner diameter of the middle diameter portion 613 is larger than the outer diameter of the friction wheel 7, and the inner diameter of the taper portion 612 decreases from the middle diameter portion 613 to the small diameter portion 614.

In use, the friction wheel 7 can be adjusted to abut against the taper portion 612 to change the friction force.

As such, the second embodiment may also achieve the same objective and beneficial effect as the abovementioned first embodiment.

Figure 8:
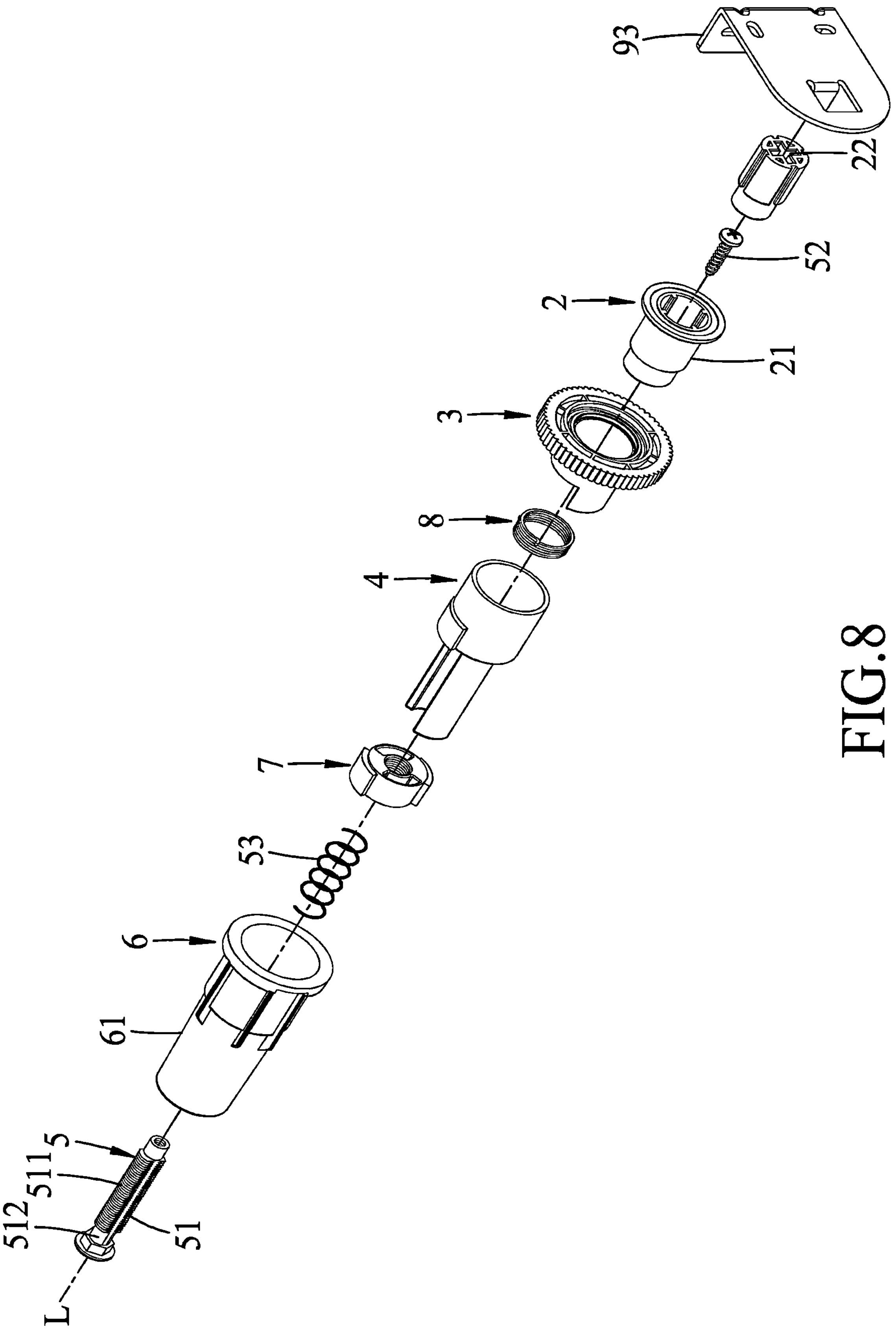
FIG. 8 is an exploded perspective view illustrating a third embodiment of the adjustable resistance tail plug according to the disclosure.
Figure 9:
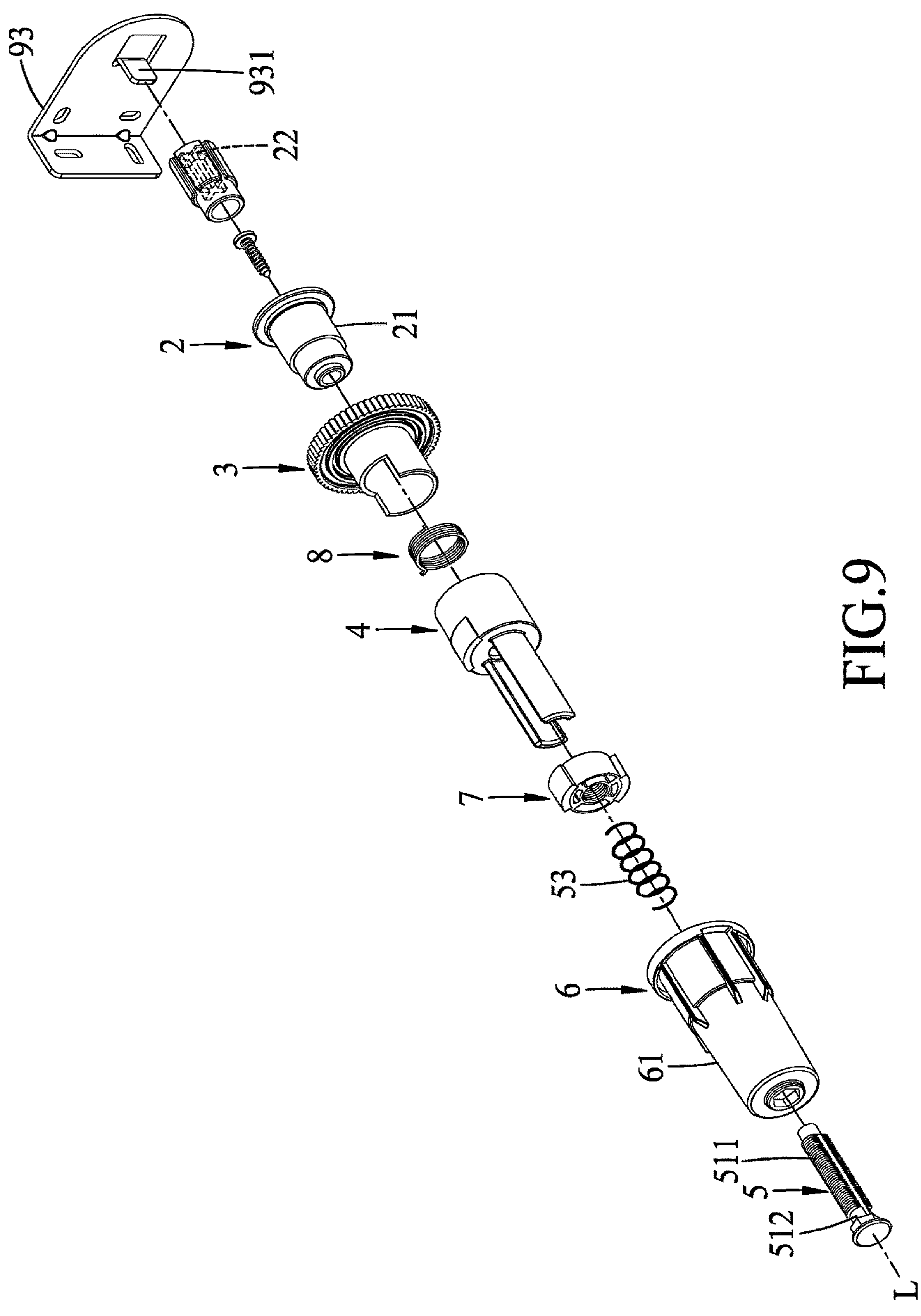
FIG. 9 is another exploded perspective view illustrating the third embodiment.
Figure 10:
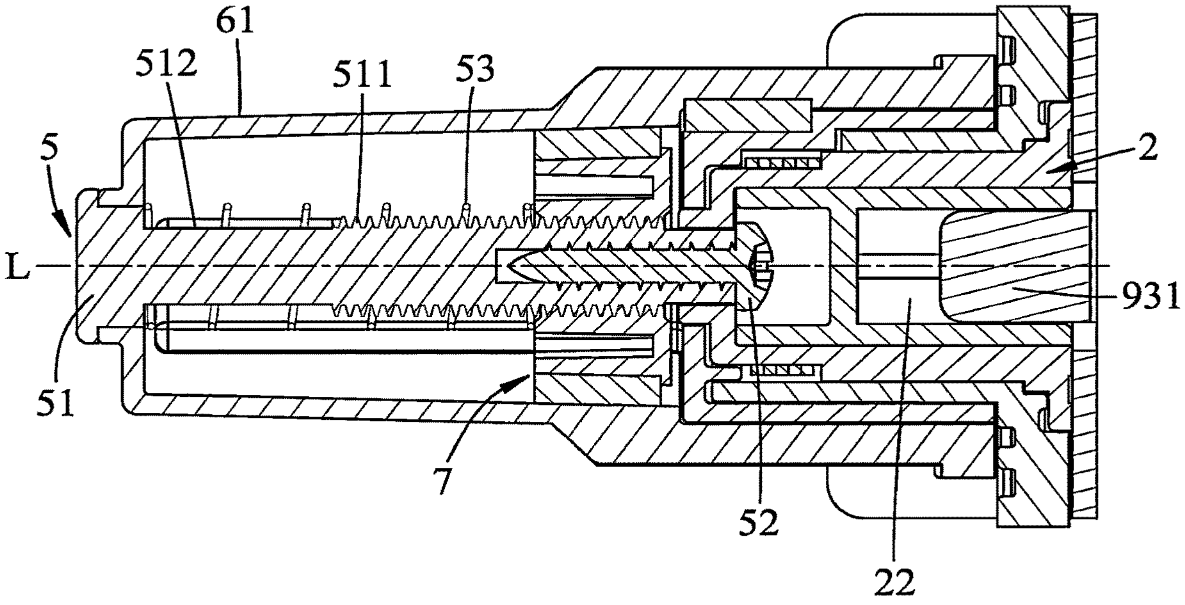
FIG. 10 is an assembled sectional view of the third embodiment and the mounting bracket, illustrating a friction wheel engaging threadably a threaded section.

Referring to FIGS. 8, 9 and 10, a third embodiment of the adjustable resistance tail plug of this disclosure is similar to the first embodiment, but differs in that:

The fixed seat 2 includes the fixed seat body 21 and the fixed hole 22. The mounting bracket 93 has a mounting frame 931 for extension into the fixed hole 22. In this embodiment, the fixed seat body 21 is a two-piece element, but is not limited thereto.

The screw rod unit 5 includes a threaded member 51 extending through the casing body 61 and adjacent to the fixed seat 2 to permit the friction wheel 7 to threadably engage therewith, a fastener 52 extending through the fixed seat 2, and a compression spring 53 surrounding the threaded member 51 and abutting between the friction wheel 7 and the casing body 61 along the axis (L). The threaded member 51 has a threaded section 511, and a non-threaded section 512 connected to one side of the threaded section 511 and one side of the casing body 61 along the axis (L). The fastener 52 is inserted into and screwed in the threaded member 51 to connect the threaded member 51 to the fixed seat 2.

Figure 11:
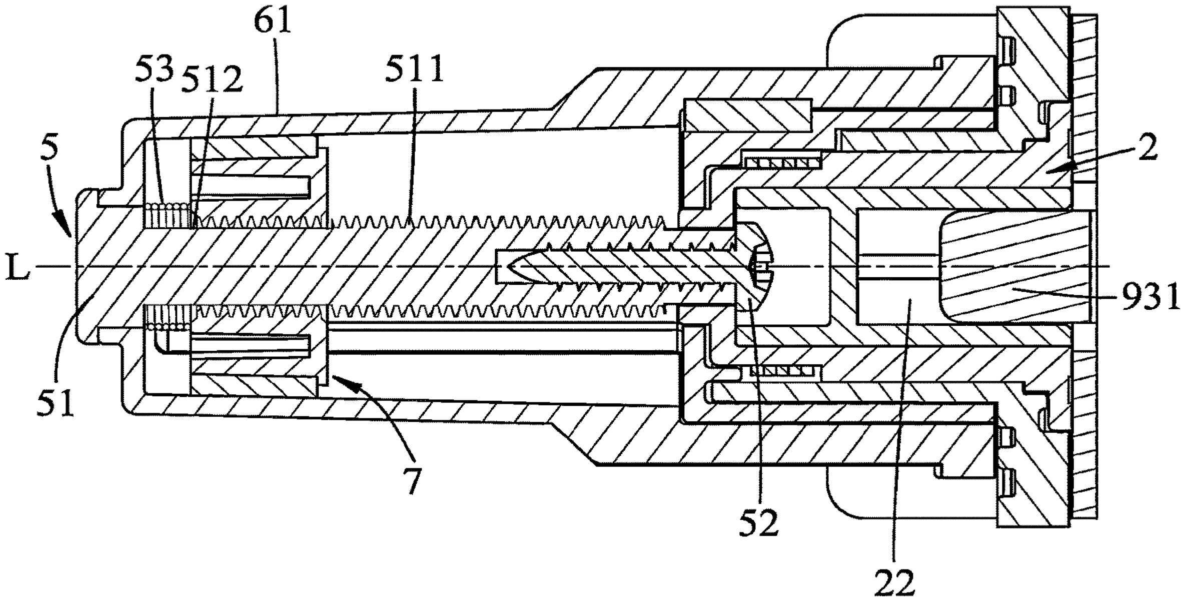
FIG. 11 is an assembled sectional view of the third embodiment and the mounting bracket, illustrating the friction wheel at a non-threaded section.

The threaded member 51 can rotate along with the rotation of the casing body 61. When the blind body 92 (see FIG. 1) is pulled down, the threaded member 51 is driven to rotate, and drive the friction wheel 7 to move along the threaded section 511 in a direction toward the non-threaded section 512, resulting in the friction wheel 7 compressing the compression spring 53. At this time, the movement of the friction wheel 7 gradually increases the friction between the casing body 61 and the friction wheel 7. With further reference to FIG. 11, when the friction wheel 7 moves to the non-threaded section 512, the friction wheel 7 is no longer limited by the non-threaded section 512, so that the casing body 61, the threaded member 51 and the friction wheel 7 can continue to rotate, so as to prevent jamming of the friction wheel 7 and the threaded member 51 which disable rotation of the casing body 61, the threaded member 51 and the friction wheel 7.

When the blind body 92 (see FIG. 1) is contracted, the friction wheel 7 is biased by the compression spring 53 to engage the threaded section 511, so that it can move away from the non-threaded section 512, and gradually reduce the friction force between the casing body 61 and the friction wheel 7. As such, the third embodiment may also achieve the same objective and beneficial effect as the first embodiment.

In summary, through the disposition of the adjusting wheel 3, the sleeve 4, the screw rod unit 5, the outer casing 6, the friction wheel 7 and the clutch spring 8, the friction wheel 7 can generate or adjust friction force through the switch of the clutch spring 8 between different states. This is done without the need to replace components, so that the objective of the present disclosure can certainly be achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An adjustable resistance tail plug for a roller blind device, the roller blind device including an aluminum tube, a blind body that is scrolled by the aluminum tube, and a mounting bracket that is disposed at one side of the aluminum tube, said adjustable resistance tail plug comprising a fixed seat, an adjusting wheel, a sleeve, a screw rod unit, an outer casing, a friction wheel and a clutch spring, said fixed seat being adapted to be disposed on said mounting bracket, and having a first circumferential surface that surrounds an axis, and a second circumferential surface that surrounds said axis, said second circumferential surface being located at one side of said first circumferential surface opposite to said mounting bracket, a section of said fixed seat that has said second circumferential surface having an outer diameter smaller than another section of said fixed seat that has said first circumferential surface, said adjusting wheel being rotatably sleeved on said first circumferential surface, said sleeve being rotatably sleeved on said adjusting wheel, said screw rod unit being connected to said fixed seat and extending along said axis, said outer casing including a casing body that is adapted to be disposed on the aluminum tube and that is connected to said screw rod unit, and an inner cavity that formed in said casing body, said inner cavity being for receiving said sleeve, a portion of said adjusting wheel and a portion of said fixed seat, said friction wheel being located within said inner cavity, engaging threadably said screw rod unit, and being driven by said sleeve to move relative to said casing body along said axis, so as to adjust a friction force between said casing body and said friction wheel, said clutch spring being sleeved on said second circumferential surface, and being partially located between said sleeve and said adjusting wheel, said clutch spring being switchable between a contracted state and an expanded state, when in the contracted state, said clutch spring being tightened to abut against said second circumferential surface so that said sleeve is prevented from rotating relative to said fixed seat by said clutch spring, when in said expanded state, said clutch spring releasing said second circumferential surface, and said adjusting wheel being rotatable with said sleeve through said clutch spring about said axis.

2. The adjustable resistance tail plug as claimed in claim 1, wherein said adjusting wheel includes a rotary section surrounding said first circumferential surface, a sleeve connecting section connected to said rotary section, and a toggling section extending from said sleeve connecting section away from said rotary section along said axis, said sleeve connecting section surrounding said first circumferential surface and being surrounded by said sleeve, said toggling section extending about said axis, and defining a notch that corresponds in position to said second circumferential surface, said clutch spring including a winding section that helically surrounds said second circumferential surface, and two protrusions that are respectively connected to two opposite sides of said winding section and that extend into said notch, said clutch spring being tightened to abut against said second circumferential surface when said protrusions are far away from each other in said notch.

3. The adjustable resistance tail plug as claimed in claim 2, wherein said sleeve includes a sleeve section sleeved on said sleeve connecting section, and an engaging section connected to one side of said sleeve section opposite to said rotary section, said sleeve section having a first annular wall that corresponds in position to said sleeve connecting section, a second annular wall that corresponds in position to said toggling section, and a boss that extends from said second annular wall toward said notch and into a space between said protrusions of said clutch spring, said engaging section being inserted into said friction wheel.

4. The adjustable resistance tail plug as claimed in claim 2, wherein said casing body has a large diameter portion that is adjacent to said rotary section and that has an inner diameter larger than an outer diameter of said friction wheel, and a taper portion that is located at one side of said large diameter portion opposite to said rotary section, said taper portion having an inner diameter decreasing from one side thereof adjacent to said large diameter portion toward another side thereof distal from said large diameter portion, the another side of said taper portion of said casing body that is distal from said large diameter portion having an inner diameter smaller than the outer diameter of said friction wheel.

5. The adjustable resistance tail plug as claimed in claim 2, wherein said casing body has a large diameter portion adjacent to said rotary section and having an inner diameter larger than the outer diameter of said friction wheel, a taper portion located at one side of said large diameter portion opposite to said rotary section, a middle diameter portion located between said large diameter portion and said taper portion and having an inner diameter smaller than that of said large diameter portion, and a small diameter portion located at one side of said taper portion opposite of said middle diameter portion and having an inner diameter smaller than that of said middle diameter portion and smaller than the outer diameter of said friction wheel, said taper portion tapering from said middle diameter portion to said small diameter portion.

6. The adjustable resistance tail plug as claimed in claim 1, wherein said friction wheel includes a wheel body threadably engaging said screw rod unit, and at least one friction member disposed on an outer periphery of said wheel body.

7. The adjustable resistance tail plug as claimed in claim 1, wherein said fixed seat includes a fixed seat body extending in the direction of said axis, and a fixed hole formed in said fixed seat body, said fixed seat body having said first circumferential surface and said second circumferential surface.

8. The adjustable resistance tail plug as claimed in claim 7, wherein said fixed hole is a non-circular hole, said fixed seat further including a fixed member that extends into said fixed hole and that is connected to said mounting bracket.

9. The adjustable resistance tail plug as claimed in claim 7, the mounting bracket having a mounting frame, wherein said fixed hole is a non-circular hole, and permits the mounting frame to be inserted therein.

10. The adjustable resistance tail plug as claimed in claim 1, wherein said screw rod unit includes a threaded member that permits said friction wheel to threadably engage therewith, and a fastener screwed in said threaded member, said fastener being inserted into and positioned in said casing body.

11. The adjustable resistance tail plug as claimed in claim 1, wherein said screw rod unit includes a threaded member extending through said casing body, a fastener screwed to said threaded member, and a compression spring surrounding said threaded member and located between and abutting against said friction wheel and said casing body along said axis, said threaded member permits said friction wheel to threadably engage therewith, said threaded member extending into said fixed seat so as to be connected to said fixed seat, said threaded member having a threaded section, and a non-threaded section connected to one side of said threaded section and one side of said casing body along said axis.

* * * * *